(12) United States Patent
Osborne et al.

(10) Patent No.: US 11,383,463 B2
(45) Date of Patent: Jul. 12, 2022

(54) METHOD OF MANUFACTURING A FIRST CURED PART AND A SECOND CURED PART

(71) Applicant: The Boeing Company, Chicago, IL (US)

(72) Inventors: Max Marley Osborne, Port Melbourne (AU); David William Reynolds, Port Melbourne (AU); Paul David Evans, Port Melbourne (AU)

(73) Assignee: The Boeing Company, Chicago, IL (US)

( * ) Notice: Subject to any disclaimer, the term of this patent is extended or adjusted under 35 U.S.C. 154(b) by 543 days.

(21) Appl. No.: 16/183,485

(22) Filed: Nov. 7, 2018

(65) Prior Publication Data
US 2020/0139650 A1 May 7, 2020

(51) Int. Cl.
*B29C 70/44* (2006.01)
*B29C 70/54* (2006.01)
*B29K 307/04* (2006.01)

(52) U.S. Cl.
CPC .......... *B29C 70/443* (2013.01); *B29C 70/545* (2013.01); *B29K 2307/04* (2013.01)

(58) Field of Classification Search
CPC ......... B29C 70/00; B29C 70/04; B29C 70/28; B29C 70/40; B29C 70/42; B29C 70/44; B29C 70/446; B29C 70/46; B29C 70/462; B29C 70/465; B29C 70/54; B29C 69/00; B29C 69/002; B29C 69/004; B29C 70/443; B29C 70/545; B29C 69/001; B29C 70/30; B29K 2307/04; B29D 99/0017

USPC ........................................................ 156/242
See application file for complete search history.

(56) References Cited

U.S. PATENT DOCUMENTS

| 4,401,495 A * | 8/1983 | McKinney | ............ B29C 53/605 156/173 |
|---|---|---|---|
| 9,358,733 B2 * | 6/2016 | Schimmler | ........... B29C 70/545 |
| 2013/0020438 A1 * | 1/2013 | Glynn | ..................... B64C 1/061 244/129.1 |

FOREIGN PATENT DOCUMENTS

EP          0069539          12/1983

OTHER PUBLICATIONS

European Patent Office Action No. 19204624.1-1017 dated Jul. 7, 2021.

* cited by examiner

*Primary Examiner* — Francisco W Tschen
*Assistant Examiner* — Abhishek A Patwardhan
(74) *Attorney, Agent, or Firm* — Quinn IP Law

(57) ABSTRACT

In a method of producing symmetrical carbon fiber reinforced composite parts, a plurality of sheets of fibrous material configured as a single structure are positioned on a tool surface where the single structure is comprised of a first composite part joined to a symmetric, second composite part. The single structure is infused with resin and cured on the tool surface, producing a single cured structure comprised of a first cured composite part joined to a second cured composite part. The single cured structure is then divided along a dividing plane, producing the symmetric first cured composite part and second cured composite part.

20 Claims, 4 Drawing Sheets

METHOD OF MANUFACTURING A FIRST CURED PART AND A SECOND CURED PART

FIELD

This disclosure is directed to a method of manufacturing composite parts. In particular, this disclosure is directed to a method of manufacturing multiple carbon fiber reinforced composite parts on a tool surface of a single tool in a single fabrication process.

BACKGROUND

In the construction of carbon fiber reinforced composite parts for example, an aircraft, a first composite part on a left hand portion of the aircraft will often have a symmetric, second composite part on the right hand portion of the aircraft. Symmetrical parts for the left hand portion of the aircraft and the right hand portion of the aircraft are often manufactured on separate sets of tooling in separate fabrication processes.

Tooling is expensive and may require separate tooling for the manufacture of symmetric left hand composite parts and right hand composite parts of the aircraft which can double tooling costs. Separate tooling could also double fabrication time and may require the need for additional space on the factory floor.

Still further, depending on the symmetric left hand composite part and the right hand composite part of an aircraft, after the parts have been laid up and cured, they could require trimming or cutting along end edges to provide end surfaces that are configured for attachment to fittings for coupling the parts to larger assemblies. Such trimming and/or cutting of composite material from the cured composite parts necessitates additional work and will create waste of composite material.

SUMMARY

The method of manufacturing a first cured composite part and a second cured part of this disclosure overcomes the earlier described disadvantages associated with the construction of carbon fiber reinforced composite parts for a left hand portion of an aircraft and a right hand portion of an aircraft.

The method of this disclosure comprises positioning fibrous material in the form of a plurality of sheets of fibrous material, such as a plurality of carbon fiber reinforced composite sheets, on a tool surface of a tool. The plurality of sheets are formed in a configuration of a single structure comprised of a first composite part and a symmetric, second composite part. The plurality of sheets have a cross-section configuration that is symmetric on opposite sides of a dividing plane through the cross-section configuration of the plurality of sheets. The plurality of sheets could be sheets of dry fibrous material or sheets of pre-preg fibrous material.

Where the plurality of sheets are sheets of dry fibrous material, a matrix or resin is infused into the plurality of sheets on the tool surface. The resin permeates the plurality of sheets.

The plurality of sheets and the resin infused into the plurality of sheets are then cured on the tool surface. The resin infused into the plurality of sheets and the curing of said resin forms a single cured structure in the configuration of a first cured part joined to a symmetric, second cured part.

The single cured structure forming the first cured part joined to the second cured composite part is then divided along a dividing plane. This produces a first cured part and a separate, second cured part, with the first cured part and the second cured part being symmetric.

Depending on the configuration of the single cured structure, the single cured structure could be divided along a dividing plane through a hollow portion of the single cured structure. This produces the first cured part and the symmetric, second cured part with a first cavity in the first cured part and a second cavity in the second cured part. The first cavity has a configuration for attachment of a first fitting to the first cavity, and the second cavity has a configuration for attachment of a second fitting to the second cavity. The first fitting and the second fitting are configured for attaching the respective first cured part and second cured part to larger structures on opposite sides of the aircraft.

The features, functions, and advantages that have been discussed can be achieved independently in various embodiments or may be combined in yet other embodiments, further details of which can be seen with reference to the following description and drawings.

DRAWINGS

FIG. 1 is a representation of an initial step in the method of this disclosure.

FIG. 2 is a representation of a cross-section view of a plurality of fibrous sheets positioned on a tool surface of a tool with the fibrous sheets formed in a configuration of a single structure comprised of a first part joined to a symmetric second part, the configuration of the single structure having a cross-section that is symmetric on opposite sides of a dividing plane through the tool surface and through the single structure.

DESCRIPTION

The construction of an aircraft is, for the most part, symmetric on opposite sides of a dividing plane through the center of the aircraft fuselage. For example, the aircraft has a left hand wing and a symmetric right hand wing on opposite sides of the dividing plane. The aircraft has a left hand stabilizer and a symmetric right hand stabilizer on opposite sides of the dividing plane. These are only a few of the many symmetric exterior components in the construction of an aircraft. Many of the interior components in the construction of an aircraft will also be symmetric on opposite sides of the dividing plane.

Manufacturing symmetric carbon fiber reinforced composite parts that go into the construction of the left hand side of an aircraft and the right hand side of the aircraft as a single structure, on a single tool surface, and in a single fabrication process can significantly reduce tooling costs, fabrication time, and the factory floor space needed for tooling.

FIGS. 1-4 are representations of the method of manufacturing a first carbon fiber reinforced composite part and a second carbon fiber reinforced composite part from a single carbon fiber reinforced composite structure, where the first composite part and the second composite part are symmetric.

Figure 1:
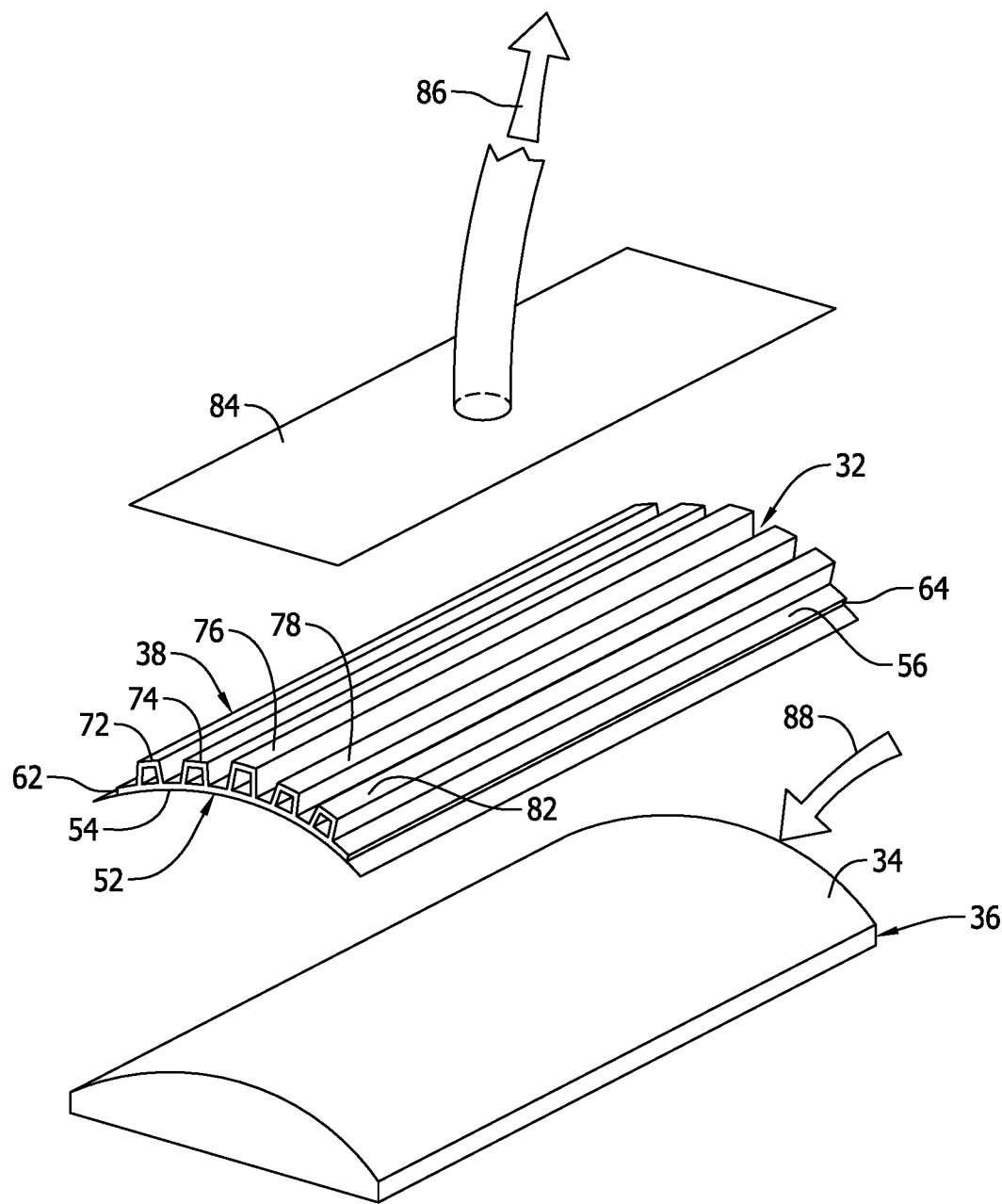

The method of this disclosure initially involves positioning fibrous material 32 on a tool surface 34 of a tool 36. The fibrous material 32 could be some type of bulk fibrous material 32, or fibrous material 32 in a particular configuration. Referring to FIG. 1, the method of this disclosure comprises positioning a plurality of carbon fiber reinforced composite sheets 32, or a plurality of sheets of fibrous material 32 on a tool surface 34 of a tool 36. The sheets 32 could be dry fibrous sheets. The sheets 32 could be constructed of pre-preg material or pre-preg fibrous sheets. In the description to follow, the plurality of sheets of fibrous material 32 or sheets 32 are dry fiber sheets. The sheets 32 could be comprised of carbon fiber tapes, carbon fiber fabrics, or a combination of both. The sheets 32 could be a preform. The sheets 32 are formed in a configuration of a single structure 38 comprised of a first composite part 42 or first part 42, joined to a symmetric, second composite part 44 or second part 44. In the explanation of the method of this disclosure represented in FIGS. 1-4, the first composite part 42 is a first portion of an aileron or a left hand portion of an aileron and the second composite part 44 is a second portion of an aileron or a right hand portion of an aileron. It should be understood that the method of this disclosure can be employed in manufacturing other symmetric carbon fiber reinforced composite parts of an aircraft's construction. The method of his disclosure is not limited to only the manufacturing of symmetric carbon fiber reinforced composite ailerons of an aircraft.

Figure 2:
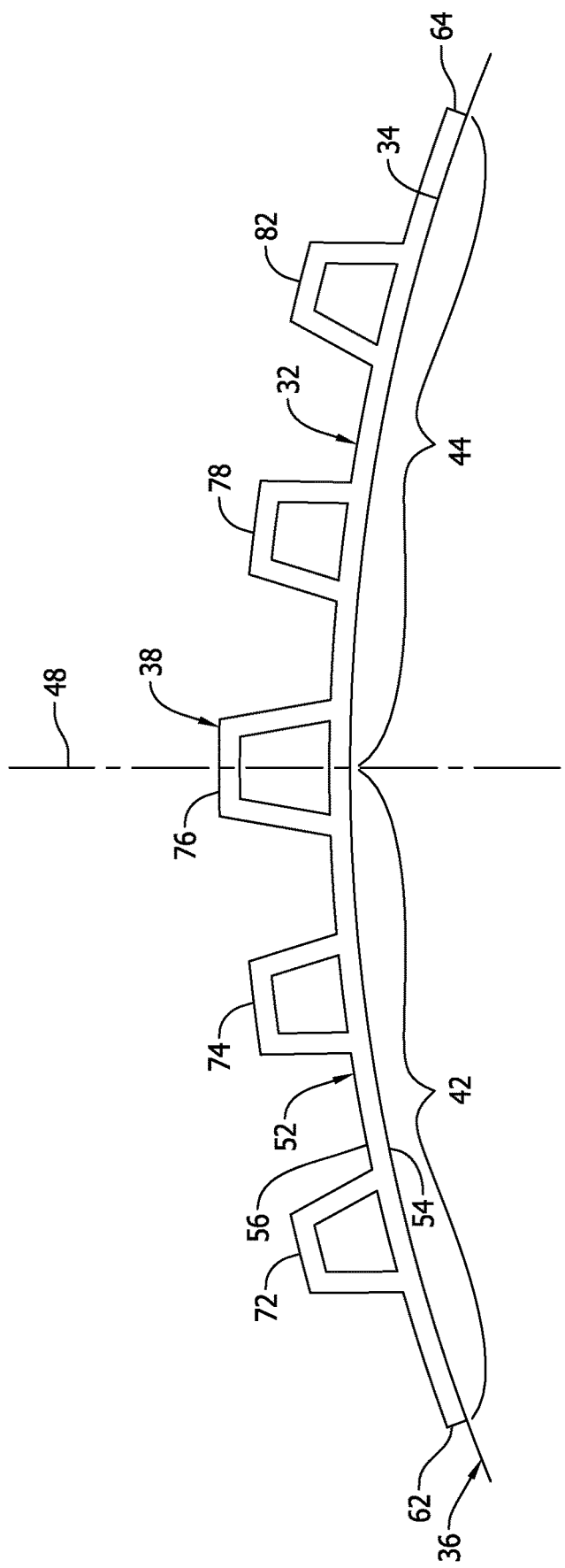

Referring to FIG. 2, the sheets 32 are laid up on the tool surface 34 or formed on the tool surface 34 in a configuration of a single structure 38. The single structure 38 has a cross section configuration that is symmetric on opposite sides of a dividing plane 48 through the tool surface 34 and through the cross-section of the sheets. The single structure 38 formed by the plurality of sheets 32 includes a base panel 52. The base panel 52 has a bottom surface 54 that engages across the tool surface 34 of the tool 36. The base panel 52 also has an opposite top surface 56. The base panel 52 has a length dimension that extends along the length of the plurality of the sheets 32 configured as the single structure 38. The base panel 52 also has a width dimension that extends between a first end edge 62 or left hand edge 62 of the base panel 52 as represented in FIG. 2, and an opposite second end edge 64 or right hand edge 64 of the base panel 52 as represented in FIG. 2.

The plurality of sheets 32 in the configuration of the single structure 38 also comprise a plurality of stiffeners formed in the plurality of sheets. The stiffeners as represented in FIG. 2 are formed as top hat stiffeners 72, 74, 76, 78, 82 that are spatially arranged across the base panel top surface 56 from the base panel first end edge 62 to the base panel second end edge 64. The top hat stiffeners 72, 74, 76, 78, 82 have length dimensions that correspond to the length dimension of the plurality of sheets 32. The top hat stiffeners 72, 74, 76, 78, 82 have cross-section dimensions and hollow interiors that increase in size as the stiffeners extend from the base panel first end edge 62 and the base panel second end edge 64 toward the top hat stiffener 76 at the center of the plurality of sheets 32, with the center top hat stiffener 76 having the largest hollow interior.

With the plurality of sheets 32 formed as a single structure 38 on the tool surface 34, a fluid impervious sheet 84, or a vacuum bag 84 is then positioned on the tool surface 34. The vacuum bag 84 completely covers over the plurality of sheets 32 configured as the single structure 38. The perimeter of the vacuum bag 84 is sealed to the tool surface 34 over the plurality of sheets 32 and around the plurality of sheets. This forms a sealed volume between the vacuum bag 84 and the tool surface 34 that is occupied by the plurality of sheets 32.

A pressure differential or vacuum pressure 86 is applied to the sealed volume between the vacuum bag 84 and the tool surface 34. The vacuum pressure 86 is represented schematically in FIG. 1. The vacuum pressure 86 applied to the sealed volume between the vacuum bag 92 and the tool surface 34 draws the vacuum bag 84 down onto the plurality of sheets 32.

A flow of liquid matrix material or resin 88 is then supplied to the interior volume between the vacuum bag 84 and the tool surface 34. The flow of liquid resin 88 is represented schematically in FIG. 1. The vacuum pressure 86 supplied to the interior volume between the vacuum bag 84 and the tool surface 34 infuses the liquid resin 88 into the plurality of sheets 32 in the configuration of the single structure 38.

The plurality of sheets 32 infused with the liquid resin 88 are then cured on the tool surface 34. Curing the plurality of sheets 32 and the resin 88 infused into the sheets forms a single cured composite structure 92 or single cured structure 92 comprised of a first cured composite part or first cured part 94, joined to a symmetric, second cured composite part or second cured part 96.

The single cured structure 92 comprised of the first cured part 94 and the second cured part 96 is then removed from the tool surface 34. The single cured structure 92 comprised of the first cured part 94 joined to the symmetric, second cured part 96 is then divided along the dividing plane 48. The single cured structure 92 is divided along the dividing plane 48 by cutting the single cured structure along the dividing plane, or by other equivalent means. This produces the first cured part 94 and the second cured part 96 as separate parts, with the first cured part 94 and the second cured part 96 being symmetric and mirror images of each other.

Figure 3:
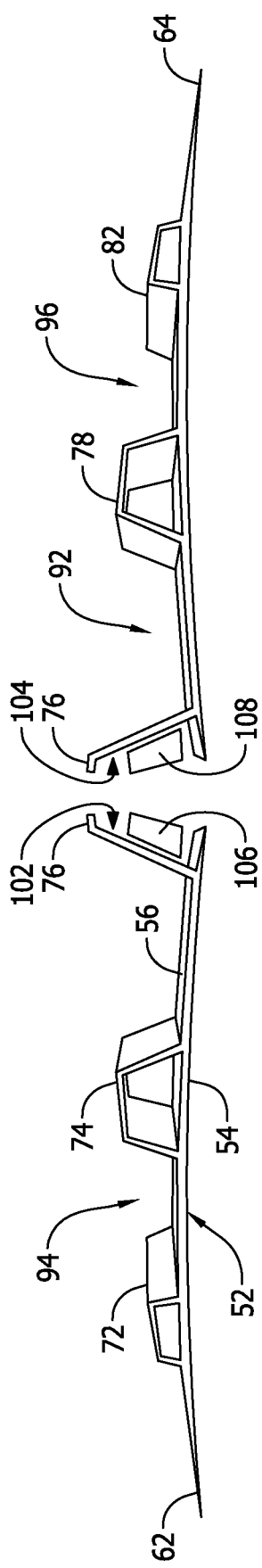
FIG. 3 is a representation of an elevation view of a first composite part formed from the single structure of FIG. 2, and a second composite part formed from the single structure of FIG. 2 that is a mirror image of and symmetric to the first composite part.
Figure 4:
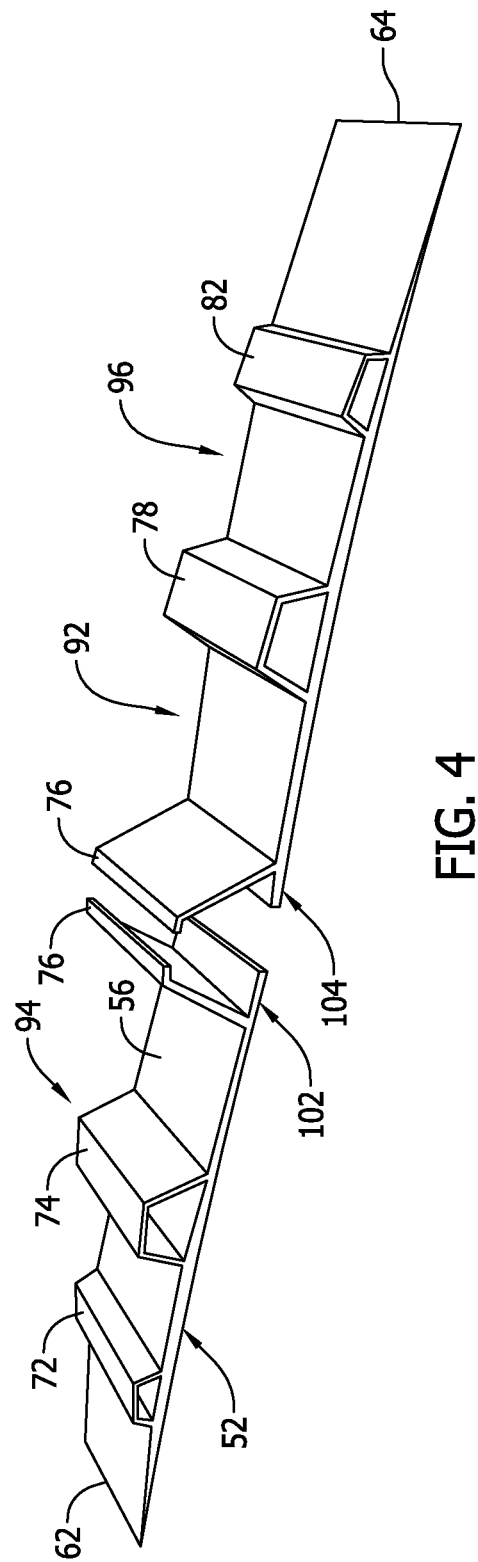
FIG. 4 is a representation of a perspective view of the first and second composite parts of FIG. 3.
Figure 5:
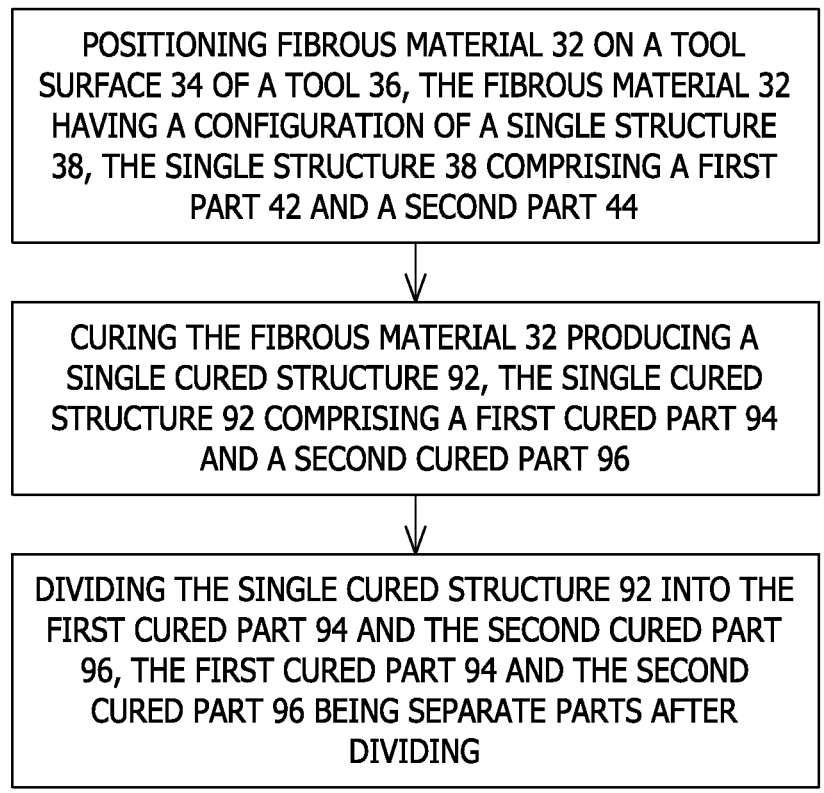
FIG. 5 is a flow chart of the method of this disclosure.

With the center top hat stiffener 76 being divided by the dividing plane 48, cutting through the single cured structure 92 along the dividing plane 48 and through the center top hat stiffener 76 produces the first cured part 94 with a first-fitting attachment surface 102 at an end edge of the first cured part, and the second cured part 96 with a second-fitting attachment surface 104 at an end edge of the second cured part. The first-fitting attachment surface 102 is represented in FIGS. 3 and 4 as a first cavity 102 having a configuration for attachment of a first fitting 106 in the first cavity 102, and the second-fitting attachment surface 104 is represented in FIGS. 3 and 4 as a second cavity 104 having a configuration for attachment of a second fitting 108 in the second cavity 104. The first fitting 106 can be used in attaching the first cured part 94 to a larger structure and the second fitting 108 can be used for attaching the second cured part 96 to the larger structure, with the first cured part 94 and the second cured part 96 on opposite sides of the larger structure. For example, the first cured part 94 could be a left side component part of an aircraft that is assembled to a left side of the aircraft and the second cured part 96 could be a right side component part of the aircraft that is assembled to the right side of the aircraft. By separating the first cured composite part 94 from the second cured composite part 96 along the dividing plane 48 through the center top hat stiffener 76, cavities for attachment of the respective fittings 106, 108 are provided in the respective composite parts 94, 96 without separate machining of the first cured part 94 and the second cured part 96 which could cause wasted composite material.

As various modifications could be made in the method of manufacturing a first part and a second part herein described and illustrated without departing from the scope of the method described, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A method of manufacturing a first cured part and a second cured part, the method comprising: laying up a plurality of sheets of fibrous material on a tool surface of a tool, the plurality of sheets of fibrous material being formed in a configuration of a single structure, the single structure comprising a first part and a second part; forming a plurality of stiffeners across a base surface of the single structure, the plurality of stiffeners defining respective hollow interiors with respective dimensions, the plurality of stiffeners including a center stiffener; curing the fibrous material producing a single cured structure, the single cured structure comprising the first cured part and the second cured part; and dividing the single cured structure along a dividing plane to separate the first cured part from the second cured part, the dividing plane extending midway through the center stiffener.

2. The method of claim 1, further comprising:
infusing a resin into the fibrous material on the tool surface; and,
curing the fibrous material and the resin infused into the fibrous material producing the single cured surface.

3. The method of claim 1, further comprising:
using a pre-preg material as the fibrous material that is positioned on the tool surface of the tool.

4. The method of claim 1, further comprising:
positioning the fibrous material on the tool surface of the tool, the fibrous material having the configuration of the single structure, where the first part and the second part are symmetric of the single structure, where the first part and the second part are symmetric on opposite sides of the dividing plane through the tool surface.

5. The method of claim 1, further comprising:
dividing the single cured structure into the first cured part and the second cured part along the dividing plane through the single cured structure with the first cured part and the second cured part being symmetric on opposite sides of the dividing plane.

6. The method of claim 5, further comprising:
dividing the single cured structure into the first cured part and the second cured part by cutting through the single cured structure along the dividing plane.

7. The method of claim 5, further comprising:
the first cured part is a left side component part of an aircraft that is assembled to a left side of an aircraft and the second cured part is a right side component part of an aircraft that is assembled to a right side of an aircraft.

8. The method of claim 1, further comprising:
dividing the single cured structure into the first cured part and the second cured part along the dividing plane through the center stiffener of the single cured structure producing a first cavity in the first cured part and a second cavity in the second cured part on opposite sides of the dividing plane.

9. The method of claim 8, further comprising:
producing the first cavity with a configuration for receiving a first fitting in the first cavity for attachment of the first fitting to the first cured part; and,
producing the second cavity with a configuration for receiving a second fitting in the second cavity for attachment of the second fitting to the second cured part.

10. A method of constructing a first cured part and a second cured part, the first cured part and the second cured part being separate parts; the method comprising: positioning sheets of fibrous material on a tool surface of a tool with the sheets of fibrous material formed in a configuration of a single structure, the single structure comprising a first part and a second part, the sheets of fibrous material having a cross-section configuration that is symmetric on opposite sides of a dividing plane through the tool surface and through the cross-section configuration of the sheets of fibrous material; forming a plurality of stiffeners across a base surface of the single structure, the plurality of stiffeners defining respective hollow interiors with respective dimensions, the plurality of stiffeners including a center stiffener; curing the sheets of fibrous material on the tool surface forming a single cured structure comprising the first cured part and the second cured part; and dividing the single cured structure along the dividing plane into the first cured part and the second cured part, the dividing plane extending midway through the center stiffener.

11. The method of claim 10, further comprising:
infusing a resin into the sheets of fibrous material positioned on the tool surface; and
curing the sheets of fibrous material and the resin infused into the sheets of fibrous material on the tool surface producing the single cured structure comprising the first cured part and the second cured part.

12. The method of claim 10, further comprising:
using sheets of pre-preg fibrous material as the sheets of fibrous material positioned on the tool surface; and
curing the sheets of pre-preg fibrous material on the tool surface forming the single cured structure comprising the first cured part and the second cured part.

13. The method of claim 10, further comprising:
forming the sheets of fibrous material in a configuration where the first part and the second part are symmetric on opposite sides of the dividing plane through the tool surface and through the cross-section configuration of the sheets of fibrous material.

14. The method of claim 10, further comprising:
dividing the single cured structure into the first cured part and the second cured part along the dividing plane through the tool surface with the first cured part and the second cured part being symmetric on opposite sides of the dividing plane.

15. The method of claim 10, further comprising:
dividing the single cured structure into the first cured part and the second cured part along the dividing plane through the tool surface and through the center stiffener of the single cured structure producing a first fitting attachment surface on the first cured part that is configured for attachment of a first fitting to the first fitting attachment surface and producing a second fitting attachment surface on the second cured part that is configured for attachment of a second fitting to the second fitting attachment surface.

16. The method of claim 1, wherein forming the plurality of stiffeners includes varying the respective dimensions of the plurality of stiffeners based on a respective distance from the dividing plane.

17. The method of claim 1, wherein forming the plurality of stiffeners includes configuring the center stiffener to have a largest value of the respective dimensions.

18. The method of claim 1, wherein forming the plurality of stiffeners includes:
- extending the plurality of stiffeners across the base surface from a first edge to a second edge of the single structure;
- configuring the respective hollow interiors in the first cured part to increase in size from the first edge to the dividing plane; and
- configuring the respective hollow interiors in the second cured part to increase in size from the second edge to the dividing plane.

19. The method of claim 10, wherein forming the plurality of stiffeners includes varying the respective dimensions of the respective hollow interiors based on a respective distance from the dividing plane.

20. The method of claim 10, wherein forming the plurality of stiffeners includes configuring the center stiffener to have a largest value of the respective dimensions.

\* \* \* \* \*